United States Patent [19]

Gustavson

[11] 4,422,370
[45] Dec. 27, 1983

[54] METHOD TO RECOVER HEAT FROM TREATMENT PREMISES AND APPARATUS FOR ACHIEVING THE METHOD

[75] Inventor: Roy Gustavson, Vaxio, Sweden
[73] Assignee: Flakt Aktiebolag, Nacka, Sweden
[21] Appl. No.: 269,691
[22] Filed: Jun. 2, 1981
[30] Foreign Application Priority Data
Jun. 5, 1980 [SE] Sweden .............................. 8004186
[51] Int. Cl.³ ............................................ B05C 15/00
[52] U.S. Cl. ............................ 98/11.5 SB; 165/47;
165/DIG. 12; 165/103
[58] Field of Search ................... 165/47, 53, 59, 111,
165/104.31, DIG. 12, 103; 34/75, 86; 62/238.6;
98/11.5 SB

[56] References Cited
U.S. PATENT DOCUMENTS

| | | |
|---|---|---|
| 2,045,115 | 6/1936 | Allen et al. ........................ 110/215 |
| 4,084,635 | 4/1978 | Marshall ..................... 165/DIG. 12 |
| 4,173,924 | 11/1979 | Bradshaw ................... 165/DIG. 12 |
| 4,313,369 | 2/1982 | Tsuruta et al. ........................ 165/59 |

FOREIGN PATENT DOCUMENTS

| | | |
|---|---|---|
| 2505535 | 8/1976 | Fed. Rep. of Germany ........................ 165/104.31 |
| 1523211 | 5/1968 | France ............................. 165/104.31 |
| 2295797 | 12/1974 | France ................................ 98/115 SB |
| 1079137 | 8/1967 | United Kingdom ........... 165/104.31 |

Primary Examiner—Albert W. Davis, Jr.
Assistant Examiner—S. Gayle Dotson
Attorney, Agent, or Firm—Dann, Dorfman, Herrell & Skillman

[57] ABSTRACT

A method and apparatus to recover thermal energy from the exhaust air from a paint spray booth for painting of automobile chasses, whereby heat from the relatively warm exhaust air is transferred to the relatively cold supply air to the booth. The outgoing air is mixed with water or other heat-exchange liquid, and the liquid is then separated in a separation-chamber (7) adjacent the ventilation outlet (6) of the booth (5), and is circulated between the chamber and a heat exchanger (2'), through which the supply air flows.

12 Claims, 2 Drawing Figures

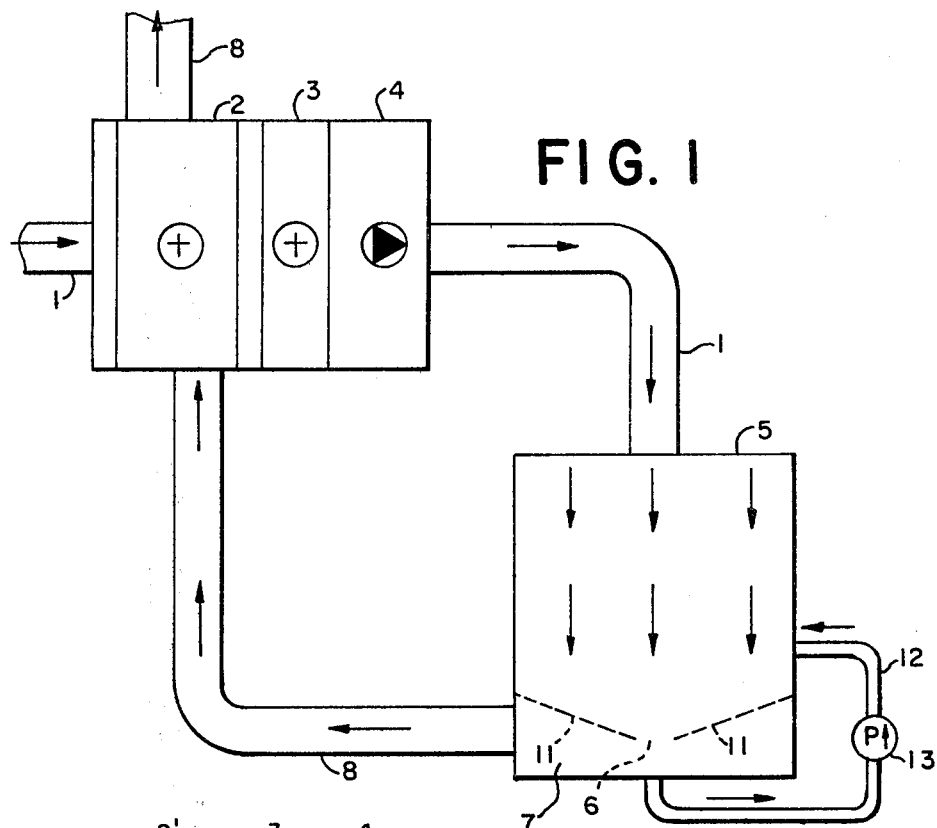
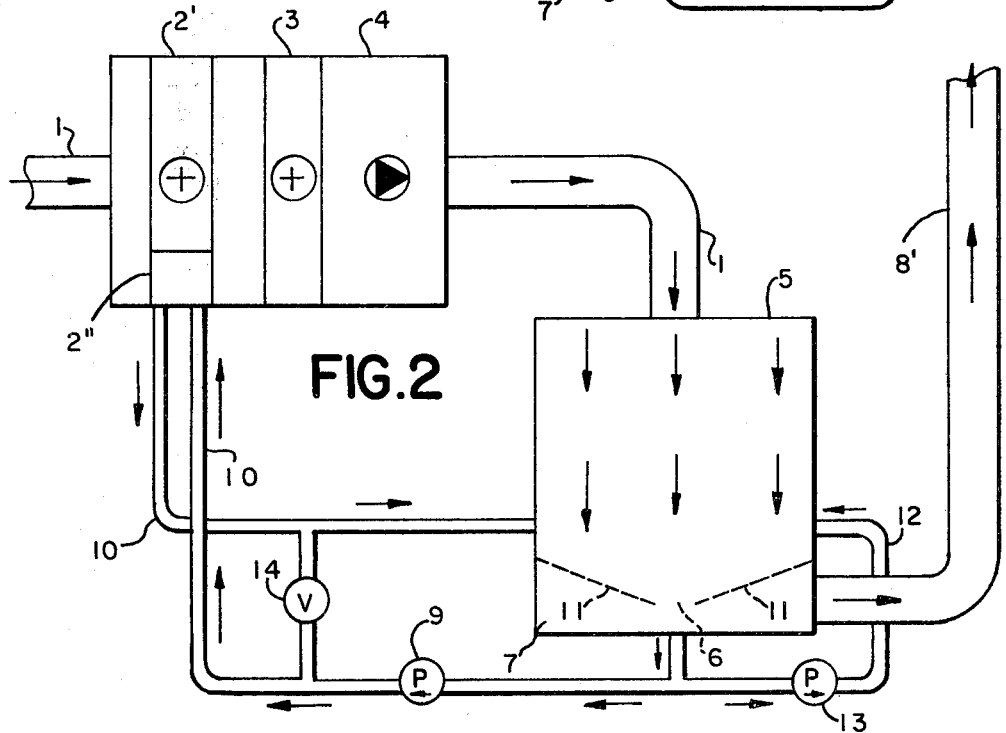

4,422,370

METHOD TO RECOVER HEAT FROM TREATMENT PREMISES AND APPARATUS FOR ACHIEVING THE METHOD

FIELD OF THE INVENTION

The present invention relates a method of recovering heat from treatment premises, and apparatus for achieving the method.

BACKGROUND OF THE INVENTION

Treatment premises of different types, in particular so-called paint spray booths for spray painting e.g automobile chasses, principally because of their spaciousness and furthermore because of the necessity for an effective ventilation, require great quantities of heated air. In today's burdensome cost situation, in particular thermal energy cost, the heated air must be utilized for the recovery of as much heat as possible.

Toward this objective, prior installations up to now allowed the cold supply air and the warm exhaust air meet in a heat exchanger, which naturally results in certain savings of energy. The exhaust air however not only is heated, but also is humidified, so that for example during wintertime, grave problems arise due to freezing insuch a heat exchanger. If the exhaust air contains pollutants, serious filtration and blockage problems can occur. Since both mediums are gaseous, poor thermal transfer characteristics moreover result, requiring relatively large and expensive heat exchangers.

SUMMARY OF THE INVENTION

The present invention therefore has as an object to improve the economical aspects of heat recovery in connection with air conditioning of treatment premises of different types, especially paint spray booths and the like with a relatively large ventilation requirements.

A further object of the invention is to create advantageous secondary effects in connection with favorable thermal recovery.

In conclusion, the invention also aims in different respect to develop and advance the technology in this field.

The stated objects are achieved according to the invention in that the warm exhaust air is contacted with a liquid heat-exchange medium which is separated from the exhaust air and is used to heat the supply air.

Furthermore the method of the invention is achieved by an apparatus comprising a heat exchanger for the supply air which is fed with liquid collected from the treatment premises after being mixed with and thereafter separated from the ventilating air.

BRIEF DESCRIPTION OF THE DRAWINGS

Further characteristics of and advantages with the invention are revealed by the following description with reference to the accompanying drawing, in which

In FIG. 1, 1 designates a duct for supply air, which passes through a first heat exchanger 2 and a second heat exchanger 3 for further increase of temperature as well as fan 4 for supplying air to a treatment premises 5, for example a paint spray booth having a grate 25 serving as the floor, and where the supplied air is distributed in a known manner in order to eventually leave the premises via one or several outlets 6 in the bottom surface 11 of the booth which is covered with a film of water supplied by a pipe 12. As the paint-laden air passes out of the booth 5 through the outlet 6 a venturi or scrubber 26 causes, it to mix with the wate and it passes through a separation chamber 7, for example to the atmosphere via an exhaust air channel 8. The water is collected in the bottom of the chamber 7 and is recirculated by a pump 13 and supply pipe 12 to the bottom 11. Up to this point, conventional method and apparatus and the method and the apparatus according to the present invention, are in substantial agreement.

DESCRIPTION OF THE PREFERRED EMBODIMENTS

Figure 1:
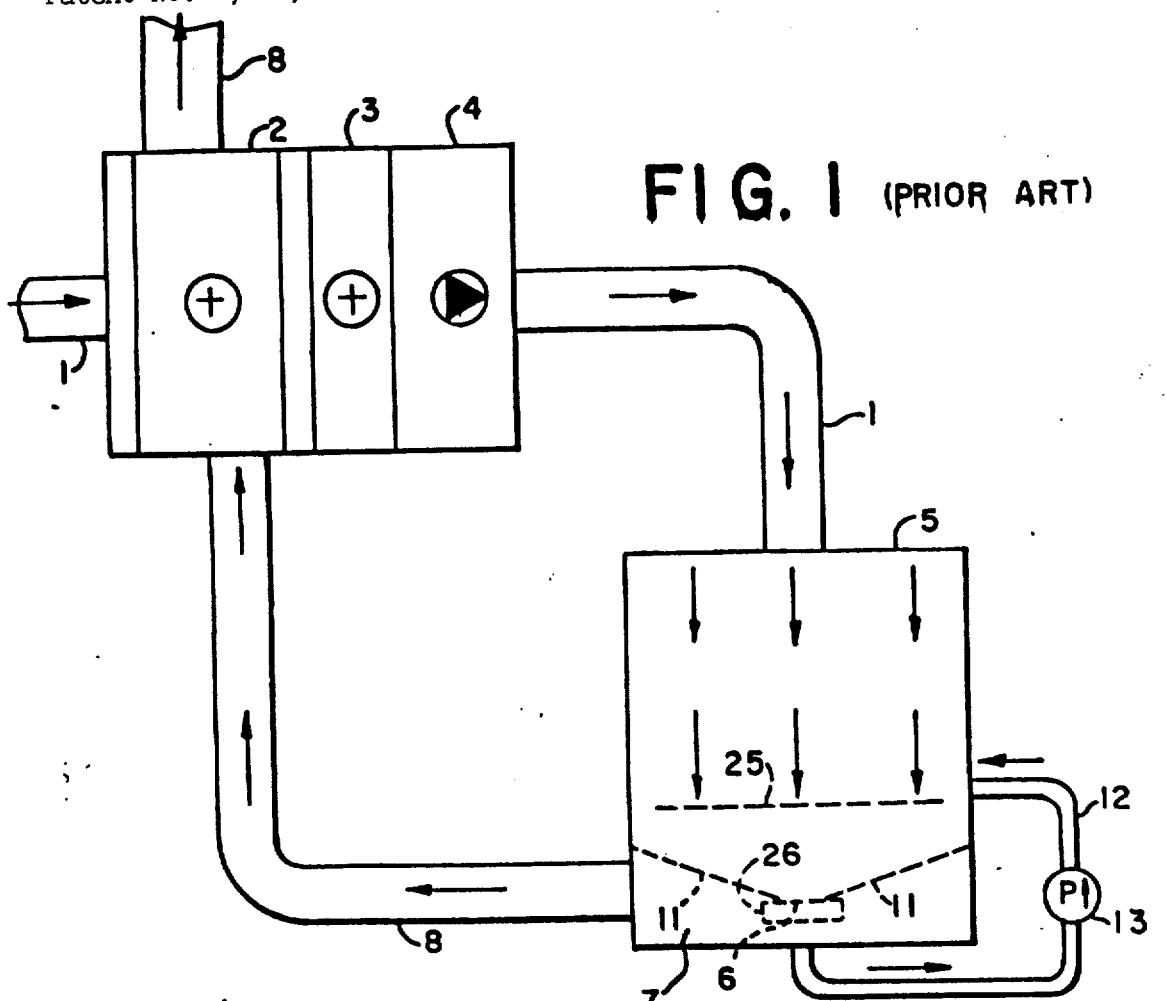
FIG. 1 shows a schematic view of the mode of operation of a substantially conventional unit for recovery of thermal energy and FIG. 2 schematically shows a method and an apparatus according to the invention for the recovery of thermal energy from a treatment premises.
Figure 2:
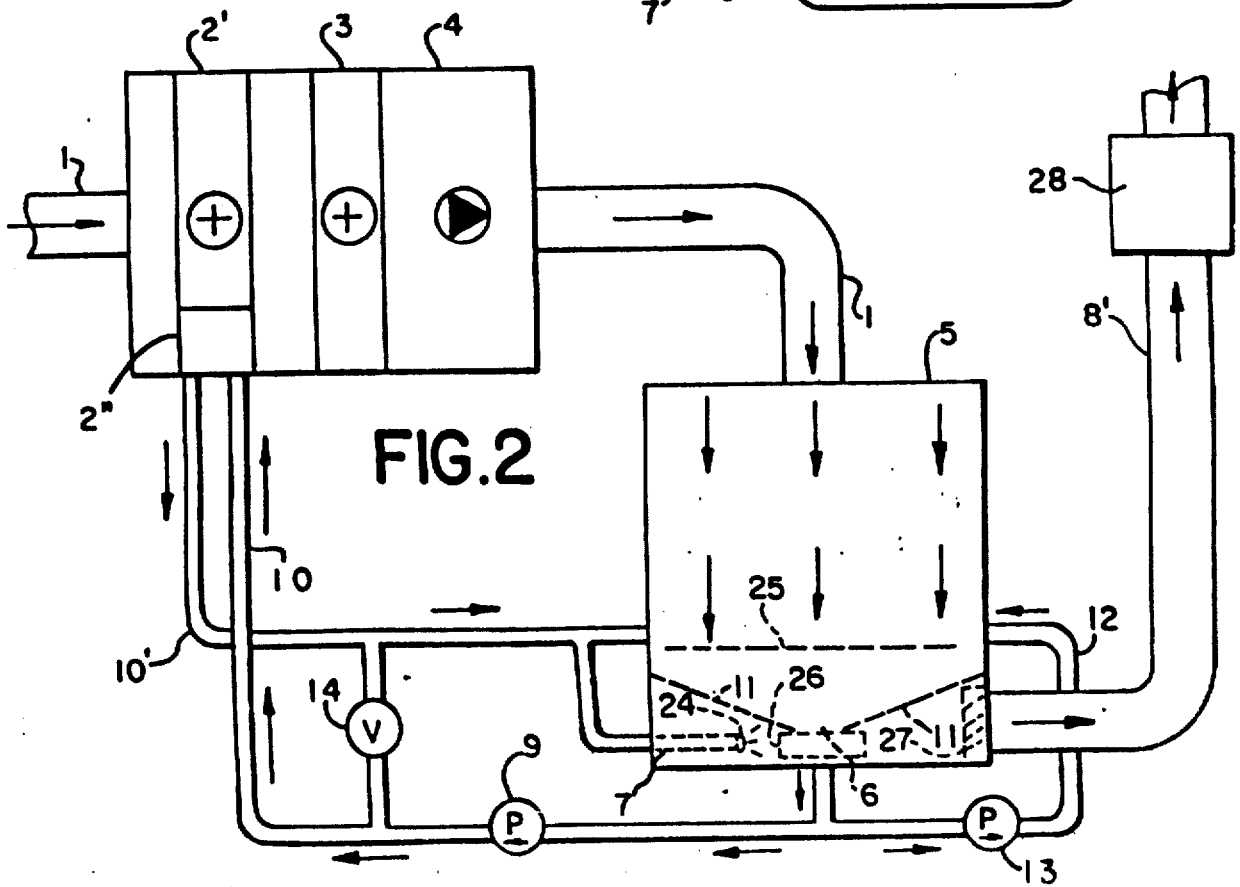

While in the case of the substantially conventional unit according to FIG. 1 the exhaust air channel 8 is connected to the first heat exchanger 2 with the resulting disadvantages set forth above, the exhaust air channel 8', according to the present invention, as illustrated in FIG. 2, is not connected to the first heat exchanger, but instead discharges preferably to the atmosphere either directly or through other areas of the premises. There are however considerable differences in the temperatures of the outgoing air in the two devices. The exhausted air temperature is relatively high in the conventional unit and relatively low in the unit according to the invention which will be explained hereafter.

According to FIG. 2, the chamber 7 has an additional pipeline 10 for liquid from the chamber 7 with a built-in circulation pump 9. The pipe 10 is connected to the first heat exchanger 2', so that, after having passed through the heat exchanger 2', the liquid is returned through a return branch 10', which opens out into the treatment premises 5, preferably above the bottom 11 so that it flows over a substantial surface of the booth 5 into the outlet or outlets 6. The liquid is preferably water, but in certain cases other fluid heat-exchange mediums can be utilized.

The liquid coming from the heat exchanger 2' has transferred its heat to the supply air coming through the air duct 1 and the flow of heat-exchange liquid into the premises 5 is consequently relatively cold or cooled down. In the vicinity of the outlet or outlets 6, according to the invention, as intensive as possible blending of the cold liquid with the warm exhaust air occurs. This can occur in different ways. For example, the working floor itself in the treatment premises can consist of a grate 25, under which the enclosed bottom surface 11 slopes toward the outlet or outlets 6. The returning liquid can in this case preferably flow along the entire or at least a greater part of this floor surface in order to be heated up by the exhaust air already on its way toward the outlet or outlets. The returning liquid can also run along a wall or other surface of the booth, against which one spray paints, so as to flush the same.

In accordance with a preferred embodiment of the present invention, a very intensive blending between the returning liquid and the exhaust air occurs in the outlet 6, which preferably is shaped as a venturi or scrubber 26, where the liquid is atomized and mixed very intensively with the exhaust air. This is intrinsically known for the cleaning of exhaust air from e.g. paint and/or dirt particles and other pollutants, but is utilized here additionally for bringing about a transfer of heat from the warm exhaust air to the cold returning liquid, which because of its aggregate condition has excellent possibilities for absorption of heat.

The fluid medium which has in this way been heated by the exhaust air, is then feed by the circulation pump 9 and the supply pipe 10 to the heat exchanger 2', where the warm liquid emits its heat to the supply air issuing from the duct 1, from where a new cycle begins. The exhaust air is simultaneously cooled down and can therefore flow through duct 8' directly to the atmosphere or to another location in the premises where it may be used for other purposes.

Owing to its great and rapid ability to absorb and emit heat, the circulated water can very efficiently heat the supply air. At the same time the entire supply air admission exchangers 2' and 3 and blower 4, can be small so that the risk of freezing is practically eliminated.

Preferably the heat exchanger 2' includes a heat pump 2" to facilitate the transfer of heat from the water to the air. If desired the heat pump 2" may be located adjacent the chamber 7 and may have controls for directing the heat elsewhere when the heat is not required to heat the supply air in the heat exchanger 2'.

There are additional advantages with such a system. The flow rate of the circulation pump 9 can consequently in a decisive manner affect the heat emitting capacity in the first heat exchanger 2'. Further there is reason to assume, that the operational life of the first heat exchanger 2' will become essentially longer, since the liquid heat-exchange medium does not cause any risk for blockage, which very well can be the case with a gaseous current passing through the heat exchanger, which will certainly always deposit pollutants.

Arbitrary devices e.g. for cleaning of the exhaust air and/or the circulated liquid or the like can naturally be included in the equipment according to FIG. 2. A drop separator 27 can be provided, for example in the chamber 7.

In addition to the circulation pump 9 built into the liquid circulation system 10 or alternative system for this purpose, the return pipe 12, which is connected to provide liquid flow between the chamber 7 and the outlet or outlets 6 in the bottom surface 11, has a built-in circulation pump 13, so that flow rate provided by the circulation pump 9 does not need to be correlated with the mixing operation to procure the desired flow of water within the area of the outlet 6. Instead, the circulation of the pump 9 can optimally be adjusted in relation to the desired flow in the heat exchanger 2', while the circulation of the pump 13 can optimally be adjusted with consideration to the mixing of liquid and the exhaust air in the outlet 6. In other words the flow rate of the pump 9 can optimally be adjustable for heat emission and the flow rate of the pump 13 for heat absorption, for example through appropriate choice of speed and/or volume. One can even consider installing a by-pass valve 14 after the pump 9 in the pipe 10 which bypasses the liquid to reduce flow through the heat exchanger 2' as does the pump 13. If the flow in the heat exchanger 2' should be increased, the bypass 14 may be positioned upstream of the pump 9.

Even instead of or as a supplement to a venturi, other conventional apparatus can be applied with the same purpose, namely at first hand mixing together of the exhaust air with a fluid heat-exchange medium for example by spray nozzles in the chamber 7, or by a scrubber arrangement 28 in the duct 8', in which case advantageous additional effects can of course exist, such as cleaning of the exhaust air or the like. For example banks of nozzles 24 can be arranged as shown in the chamber 7, in the duct 8' o at another location in the exhaust air system. Preferably the heat-exchange medium is precipitated out of the exhaust air and recycled to the separation chamber 7 with or without filtration to remove solid particulates entrained therein.

The forms of the embodiment described above and illustrated in the drawings are to be considered as non-limiting examples, which can be modified and supplemented at will within the scope of the inventive idea and the following claims.

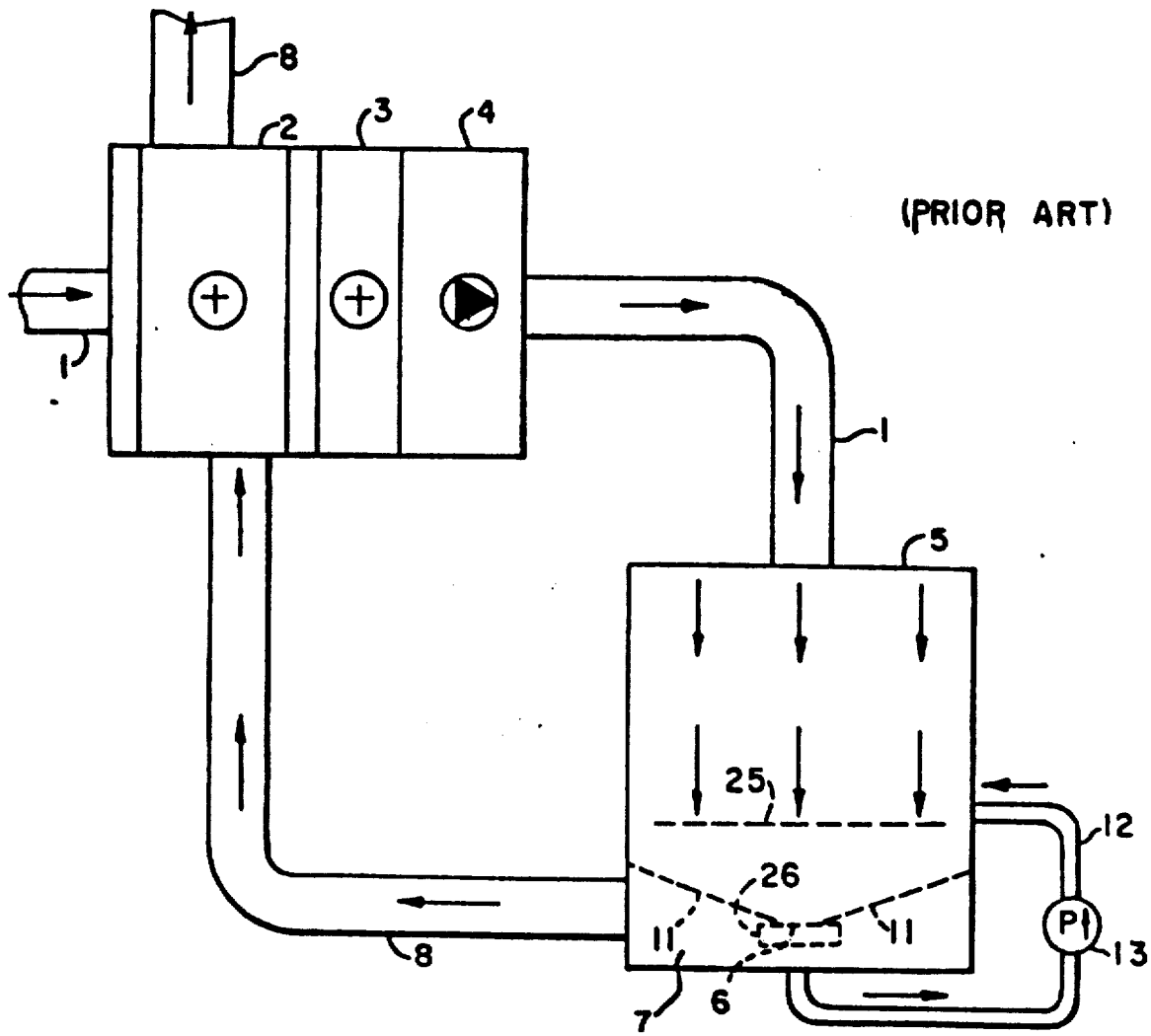

I claim:

1. A method of recovering heat from treatment premises where relatively warm air is exhausted and relatively cold supply air enters into the said premises, comprising the steps of contacting the exhausted air with a liquid heat-exchange medium in a heat-absorption area adjacent the ventilation outlet of the premises, separating the liquid heat-exchange medium from the exhausted air and recirculating at least one part of the liquid medium from said area to a heat exchanger for recovery of heat, warming the supply air with the heat recovered from said liquid heat-exchange medium by a said heat exchanger, and returning said one part to said heat-absorption area, and recirculating a second part of said liquid medium from said area directly back to said area at a rate of flow to assure optimum heat absorption in said area.

2. A method according to claim 1 wherein said separation is effected downstream of said area, and said first and second parts are separately recirculated to a position upstream of said area.

3. A method according to claim 1 including the step of separately regulating the circulation of said first and second parts of the liquid medium.

4. Apparatus for recovery of heat from the exhaust air from a paint spray booth having a ventilation air outlet area, said heat recovery apparatus comprising a heat exchanger through which the supply air for the booth passes, means to contact a liquid with the exhaust air in said outlet area to cool the air and warm the liquid, means for collection of said warm liquid after contact with the exhaust air, means to recirculate at least one portion of the warm liquid from said outlet area to said heat exchanger to warm the supply air, and return said one portion of the liquid from said heat exchanger to said outlet area, and means to recirculate a second portion of the collected liquid area directly to said outlet area without circulating said second portion through said heat exchanger.

5. Apparatus according to claim 4, characterized in that the means to recirculate liquid to the air outlet area flushes a substantial part of the surface of the booth with recirculated liquid.

6. Apparatus according to claim 4 wherein said means to recirculate a second portion of the collected liquid comprises return pipe means with means to control the flow rate of the said second portion.

7. Apparatus according to claim 6 wherein said control means comprises a pump.

8. Apparatus according to claim 6 wherein said control means comprises a bypass around said heat exchanger and a bypass valve therein.

9. Apparatus according to claim 4, characterized in that the outlet area comprises at least one contact device.

10. Apparatus according to claim 6 wherein said contact device is a venturi.

11. Apparatus according to claim 6 wherein said contact device is a bank of nozzles.

12. Apparatus according to claim 6 wherein said contact device is a scrubber.

* * * * *

UNITED STATES PATENT AND TRADEMARK OFFICE
CERTIFICATE OF CORRECTION

PATENT NO. : 4,422,370

DATED : December 27, 1983

INVENTOR(S) : ROY GUSTAVSON

It is certified that error appears in the above-identified patent and that said Letters Patent is hereby corrected as shown below:

The title page should be deleted to appear as per attached page.

Column 1, line 26, "insuch" should read --in such--;
line 43, "respect" should read --respects--.
Column 2, line 8, delete the comma (,) after "causes"; "wate" should read --water--.
Column 3, line 6, "feed" should read --fed--;
line 68, "o" should read --or--
Claim 1, line 6, "are" should read --area--.

Signed and Sealed this

First Day of May 1984

[SEAL]

Attest:

GERALD J. MOSSINGHOFF

*Attesting Officer*   *Commissioner of Patents and Trademarks*

United States Patent [19]
Gustavson

[11] 4,422,370
[45] Dec. 27, 1983

[54] METHOD TO RECOVER HEAT FROM TREATMENT PREMISES AND APPARATUS FOR ACHIEVING THE METHOD

[75] Inventor: Roy Gustavson, Vaxio, Sweden
[73] Assignee: Flakt Aktiebolag, Nacka, Sweden
[21] Appl. No.: 269,691
[22] Filed: Jun. 2, 1981
[30] Foreign Application Priority Data
  Jun. 5, 1980 [SE] Sweden ............................ 8004186
[51] Int. Cl.³ .............................................. B05C 15/00
[52] U.S. Cl. .................... 98/11.5 SB; 165/47; 165/DIG. 12; 165/103
[58] Field of Search .............. 165/47, 53, 59, 111, 165/104.31, DIG. 12, 103; 34/75, 86; 62/238.6; 98/11.5 SB

[56] References Cited
U.S. PATENT DOCUMENTS

| | | | |
|---|---|---|---|
| 2,045,115 | 6/1936 | Allen et al. | 110/215 |
| 4,084,635 | 4/1978 | Marshall | 165/DIG. 12 |
| 4,173,924 | 11/1979 | Bradshaw | 165/DIG. 12 |
| 4,313,369 | 2/1982 | Tsuruta et al. | 165/59 |

FOREIGN PATENT DOCUMENTS

| | | | |
|---|---|---|---|
| 2505535 | 8/1976 | Fed. Rep. of Germany | 165/104.31 |
| 1523211 | 5/1968 | France | 165/104.31 |
| 2295797 | 12/1974 | France | 98/115 SB |
| 1079137 | 8/1967 | United Kingdom | 165/104.31 |

*Primary Examiner*—Albert W. Davis, Jr.
*Assistant Examiner*—S. Gayle Dotson
*Attorney, Agent, or Firm*—Dann, Dorfman, Herrell & Skillman

[57] ABSTRACT

A method and apparatus to recover thermal energy from the exhaust air from a paint spray booth for painting of automobile chasses, whereby heat from the relatively warm exhaust air is transferred to the relatively cold supply air to the booth. The outgoing air is mixed with water or other heat-exchange liquid, and the liquid is then separated in a separation-chamber (7) adjacent the ventilation outlet (6) of the booth (5), and is circulated between the chamber and a heat exchanger (2'), through which the supply air flows.

12 Claims, 2 Drawing Figures

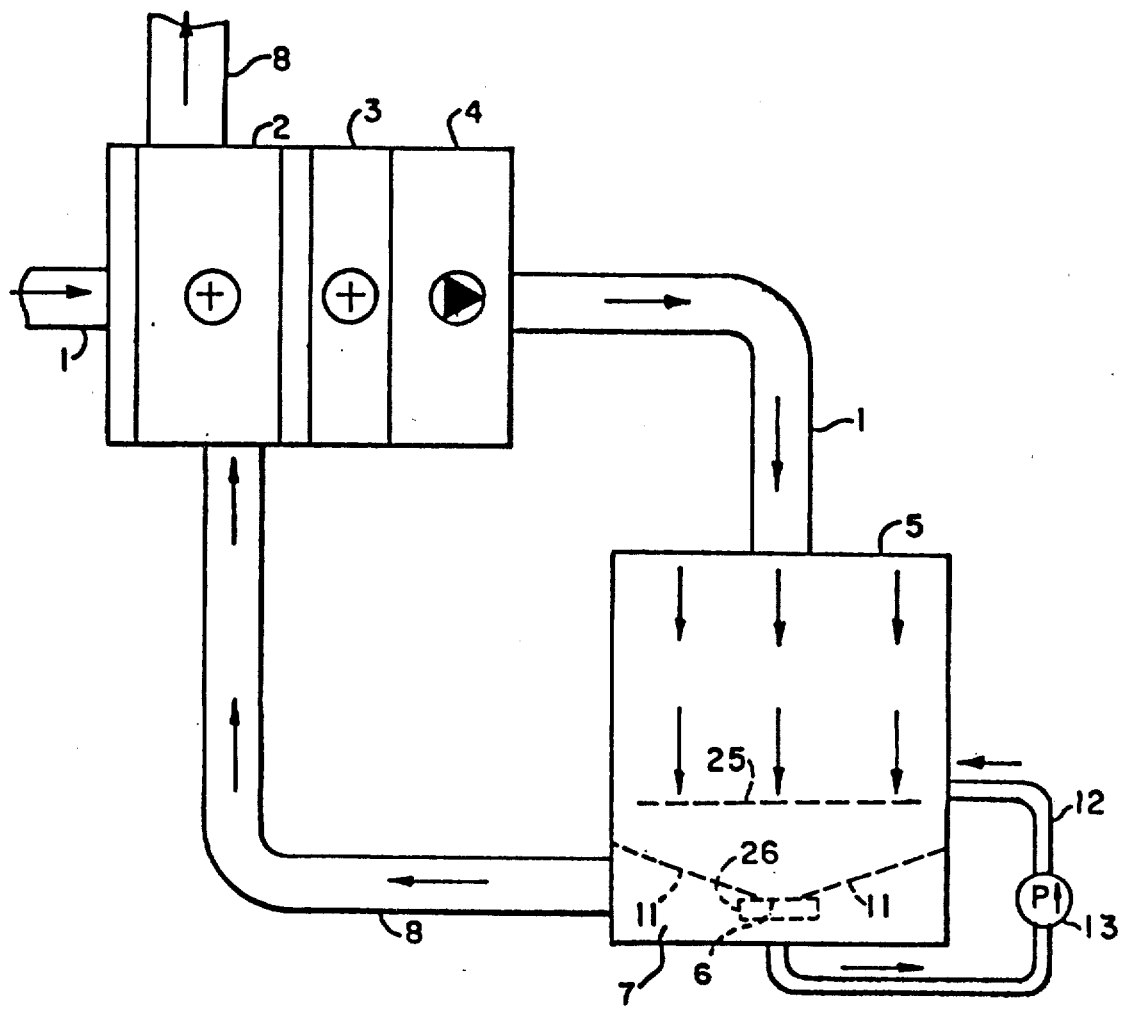

UNITED STATES PATENT AND TRADEMARK OFFICE
CERTIFICATE OF CORRECTION

PATENT NO. :  4,422,370

DATED     :  December 27, 1983

INVENTOR(S) :  Roy Gustavson

Page 1 of 3

It is certified that error appears in the above-identified patent and that said Letters Patent is hereby corrected as shown below:

The title page and the sheet of drawing should appear as shown on the attached sheets.

Column 1, line 26, "insuch" should read -- in such --.
        line 43, "respect" should read -- respects --.
Column 2, line 8, delete the comma (,) after "causes";
"wate" should read -- water --.
Column 3, line 6, "feed" should read -- fed --;
        line 68, "o" should read -- or --.
Claim 1, line 6, "are" should read -- area --.

This certificate supersedes Certificate of Correction issued May 1, 1984.

Signed and Sealed this

Fourth Day of September 1984

[SEAL]

Attest:

*Attesting Officer*

GERALD J. MOSSINGHOFF

*Commissioner of Patents and Trademarks*

United States Patent [19]

Gustavson

[11] 4,422,370
[45] Dec. 27, 1983

[54] METHOD TO RECOVER HEAT FROM TREATMENT PREMISES AND APPARATUS FOR ACHIEVING THE METHOD

[75] Inventor: Roy Gustavson, Vaxio, Sweden

[73] Assignee: Flakt Aktiebolag, Nacka, Sweden

[21] Appl. No.: 269,691

[22] Filed: Jun. 2, 1981

[30] Foreign Application Priority Data

Jun. 5, 1980 [SE] Sweden ............... 8004186

[51] Int. Cl.³ ............................................. B05C 15/00
[52] U.S. Cl. ........................... 98/11.5 SB; 165/47;
165/DIG. 12; 165/103
[58] Field of Search ............... 165/47, 53, 59, 111,
165/104.31, DIG. 12, 103; 34/75, 86; 62/238.6;
98/11.5 SB

[56] References Cited

U.S. PATENT DOCUMENTS

| | | | |
|---|---|---|---|
| 2,045,115 | 6/1936 | Allen et al. | 110/215 |
| 4,084,635 | 4/1978 | Marshall | 165/DIG. 12 |
| 4,173,924 | 11/1979 | Bradshaw | 165/DIG. 12 |
| 4,313,369 | 2/1982 | Tsuruta et al. | 165/59 |

FOREIGN PATENT DOCUMENTS

| | | | |
|---|---|---|---|
| 2505535 | 8/1976 | Fed. Rep. of Germany | 165/104.31 |
| 1523211 | 5/1968 | France | 165/104.31 |
| 2295797 | 12/1974 | France | 98/115 SB |
| 1079137 | 8/1967 | United Kingdom | 165/104.31 |

Primary Examiner—Albert W. Davis, Jr.
Assistant Examiner—S. Gayle Dotson
Attorney, Agent, or Firm—Dann, Dorfman, Herrell & Skillman

[57] ABSTRACT

A method and apparatus to recover thermal energy from the exhaust air from a paint spray booth for painting of automobile chasses, whereby heat from the relatively warm exhaust air is transferred to the relatively cold supply air to the booth. The outgoing air is mixed with water or other heat-exchange liquid, and the liquid is then separated in a separation-chamber (7) adjacent the ventilation outlet (6) of the booth (5), and is circulated between the chamber and a heat exchanger (2'), through which the supply air flows.

12 Claims, 2 Drawing Figures